United States Patent [19]

Noponen

[11] Patent Number: 5,293,351
[45] Date of Patent: Mar. 8, 1994

[54] ACOUSTIC SEARCH DEVICE

[75] Inventor: Seppo Noponen, Nivala, Finland

[73] Assignee: Transducer Valley, Inc., Ainastalo, Finland

[21] Appl. No.: 930,706

[22] PCT Filed: Apr. 3, 1991

[86] PCT No.: PCT/FI91/00095
§ 371 Date: Oct. 5, 1992
§ 102(e) Date: Oct. 5, 1992

[87] PCT Pub. No.: WO91/15781
PCT Pub. Date: Oct. 17, 1991

[30] Foreign Application Priority Data

Apr. 5, 1990 [FI] Finland ................................. 901724

[51] Int. Cl.⁵ ............................................. G03B 42/06
[52] U.S. Cl. ............................................. 367/7; 367/910
[58] Field of Search ................................... 367/910, 7

[56] References Cited

U.S. PATENT DOCUMENTS

| 3,759,324 | 6/1973 | Coltman | 367/910 |
| 3,784,805 | 1/1974 | Rolle | 367/910 |
| 3,800,273 | 3/1974 | Rolle | 367/910 |
| 4,041,441 | 8/1977 | Johnson | 367/910 |

Primary Examiner—Daniel T. Pihulic
Attorney, Agent, or Firm—Pollock, Vande Sande & Priddy

[57] ABSTRACT

An acoustic search device comprises an ultrasonic transducer with a plurality of elements for transmitting acoustic signals toward a viewed search area and for receiving echo signals therefrom, a display, an electronic unit and an optical viewing device. The electronic unit controls the transducer and the display which shows a display image of the viewed search area based on the echo signals reflected from the viewed search area. The display image is seen by means of the optical viewing device. The optical viewing device, the display, and the ultrasonic transducer are arranged to form a part of the protective cap of a diver and are situated in a protective cap, substantially in succession in the direction of sight of the diver.

11 Claims, 1 Drawing Sheet

1

ACOUSTIC SEARCH DEVICE

FIELD OF THE INVENTION

The present invention relates to an acoustic search device adapted to be used by a diver.

BACKGROUND ART

Search devices of this kind have been, for example, presented in the following patent publications: U.S. Pat. No. 3,800,273, U.S. Pat. No. 3,784,805 and U.S. Pat. No. 3,739,324. The first publication discloses an acoustic search device which is to be worn by a swimmer diver. The device comprises a separate viewing mask assembly and a control unit which contains the ultrasonic transducer assembly. A fiber optic image cable is used for transferring the display image from the ultrasonic transducer to the optical viewing device. The most efficient mode of operation is to use the control unit like a hand held electric light. The patent publication U.S. Pat. No. 3,784,805 discloses an acoustic search device which similarly comprises a face mask with an optical viewing device and a separate ultrasonic transducer unit which contains electroacoutical transducer elements suitable for both transmitting and receiving acoustic signals. The display image from the ultrasonic transducer is transferred to the optical viewing device inside the face mask via a fiber optic cable. The patent publication U.S. Pat. No. 3,739,324 discloses an acoustic system for viewing underwater objects and a way for obtaining a depth perception by means of a rotating transparent disk in the optical viewing device. The display image is viewed through the disk which is positioned in front of one eye. The rotary motion of the disk is synchronized with the operation of the ultrasonic transmitter.

The drawback of the above acoustic search devices is the fact that their use is almost impossible in circumstances where, on one hand, the image seen must correspond to reality and, on the other hand, the device must be of such simple and compact construction that it does not make the movements and operations of the user difficult.

SUMMARY OF THE INVENTION

The objective of the present invention is to obtain a search device, especially suitable for use in rescue operations, which can be used in circumstances, where visibility is extremely low, and by means of which the user, for example a smoke diver, is able to "see" in a thick smoke and, therefore, is able to move in a burning building so that his hands, however, are all the time free to perform rescue activities. A further objective is to obtain such a device by means of which the user of the device is able to see the "invisible" surroundings so that the dimensions correspond to reality and are as natural as possible which greatly facilitates moving of the person using the search device.

The search device of the invention brings about a significant improvement to the selection of devices which are available for underwater and particularly for fire rescue operations. The optical viewing device, the display and the ultrasonic transducer are placed in succession in the direction of the sight of a diver, for example a smoke diver. Therefore, the ultrasonic transducer generates a display image which is as natural as possible since it is measured exactly at the eye level and since the display image changes whenever the head is turned. The image is formed on the display in front of the eyes of the smoke diver whereby the smoke diver is able to proceed in the space filled with smoke and observe for example the unconscious victims. It is essential that the smoke diver's hands are free so that he can use them in helping the victims.

According to another embodiment of the invention, the search device contains two displays on each of which an image is formed of the viewed search area of the ultrasonic transducer. These two images are viewed through the optical viewing device with the outcome that one sees, through the viewing device, an image with a three dimensional impression.

The invention will be described in detail in the following referring to the enclosed drawing, in which

DETAILED DESCRIPTION OF THE PREFERRED EMBODIMENT

Figure 1:
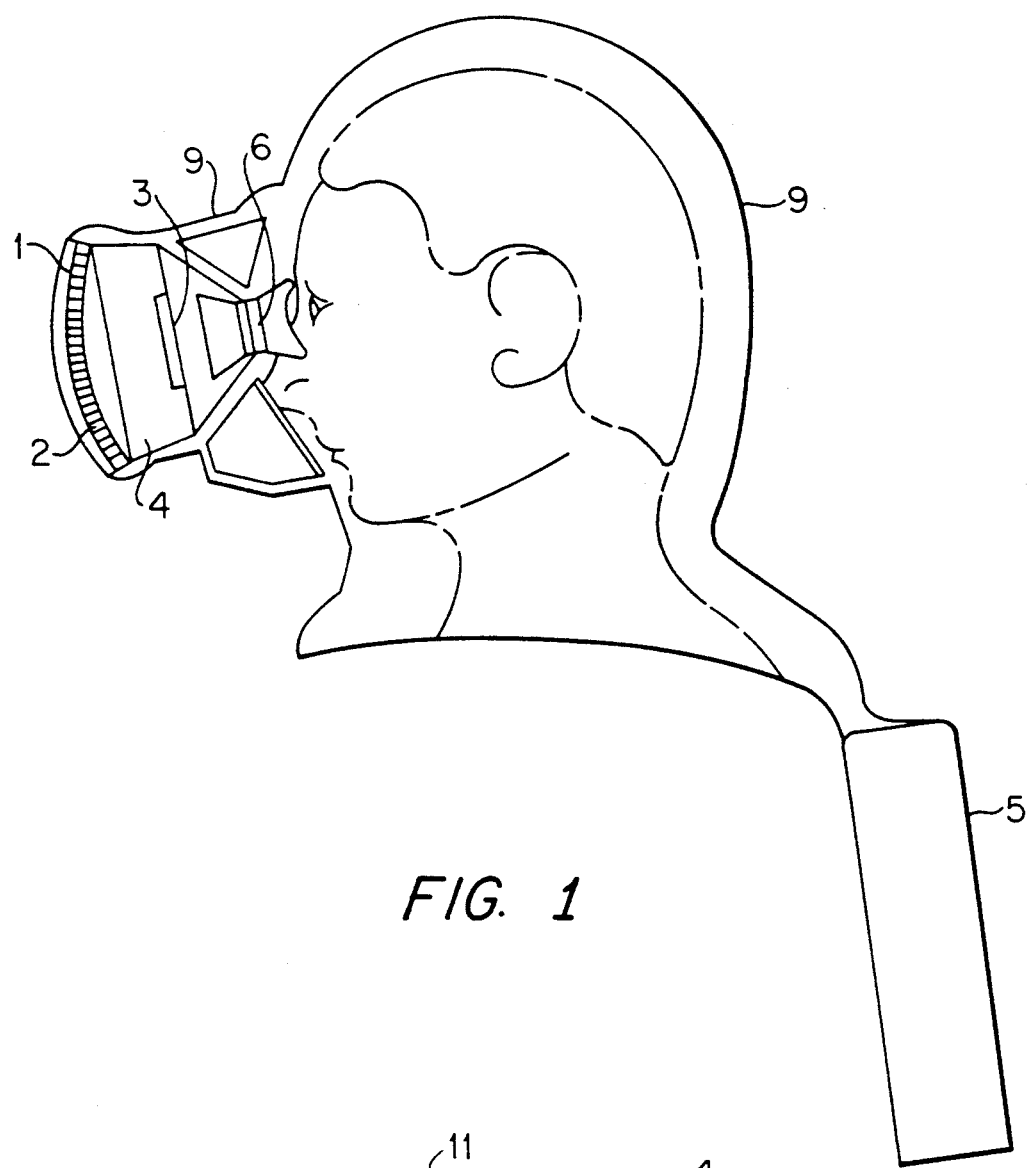
FIG. 1 shows an ultrasonic search device placed in connection with a protective cap of a breathing device of a smoke diver.

According to FIG. 1, the search device comprises a matrix structured ultrasonic transducer 1, which is composed of several ultrasonic elements 2. Behind the ultrasonic transducer 1 there is a display 3 whose display image 7 is viewed by means of an optical viewing device 6. The display 3 contains a matrix of LEDs or other image forming device, which contains light points, like, for example a liquid crystal display or elctroluminescence display The electronic unit 4, which has energy from a protected and preferably portable accumulator 4, takes control over the operations of the ultrasonic transducer 1 such as transmitting, directing and focusing of the ultrasonic wave crest as well as receiving of the echo and controls the operation of the display 3. The electronic unit 4 comprises a microprocessor or the like unit which is capable of effective calculations. Simultaneously, one or more of the ultrasonic elements 2 of the ultrasonic transducer can function as transmitters and/or receivers or in some other way under the control of the electronic unit 4. The operation of the ultrasonic elements 2 of the ultrasonic transducer 1 takes place synchronously with the operation of the display 3 so that the display 3 follows the viewed search area in front quickly enough for the image to be sufficiently kept up with the real time.

By means of the ultrasonic transducer 1 a convex ultrasonic wave crest is obtained which is directed in a desired direction and which can be focused as a cone of a specific form to a specific distance. The direction of the wave crest and the cone depends on how the electronic unit 4 activates the ultrasonic elements 2 of the ultrasonic transducer 1. Activation, in this context, means that specific ultrasonic elements 2 of the ultrasonic transducer are fed, at suitable instants of time, with electric power at such a frequency that the corresponding acoustic wave propagates well in air.

Figure 2:
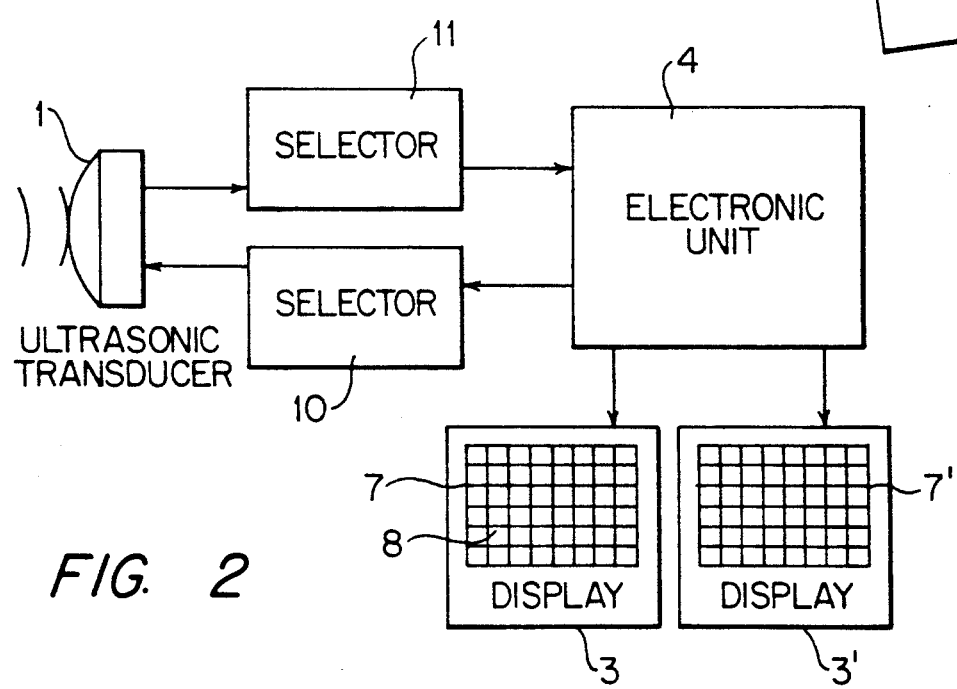
FIG. 2 shows schematically the parts of the above ultrasonic search device.

An ultrasonic wave crest proceeding towards a specific object can be achieved in several different ways. However, the common factor is that the ultrasonic waves generated in the ultrasonic elements 2 must be in such a phase relationship with each other that the waves amplify each other in the desired direction and mainly cancel each other in other directions. If the ultrasonic transducer 1 is formed like a convex portion of a spherical surface, as shown in FIG. 1, directing can be advantageously accomplished by using a so-called calotte method. In this case, the ultrasonic elements 2 which are to be activated are situated on the surface of such a calotte whose normal axis points to the desired direction. A concave wave crest that focuses on a specific point can be obtained so that at first ultrasonic elements 2 lying on the outermost ring of the calotte are activated and then, exactly after a specific time interval, ultrasonic elements 2 on the inner ring are activated and so on. So the last ultrasonic elements 2 to be activated are the ones in the middle of the calotte. In this way, an ultrasonic wave crest is obtained from the ultrasonic transducer 1 which propagates towards a particular point of the viewed search area. As shown in FIG. 2, the electronic unit 4 sends data to the selector unit 10, which then performs the activation of the required ultrasonic elements 2. In a corresponding way, the selector unit 11 transmits the received echo signal data to the electronic unit 4.

If there is, at a specific point of the viewed search area, an obstacle that is a surface or a part of a surface that is perpendicular relative to the direction of propagation of the wave crest, reflection of the wave takes place and an echo is obtained which returns back to the ultrasonic transducer 1 and which can now be detected by the ultrasonic elements 2 of the ultrasonic transducer 1 which now function as receivers. Therefore, all details that lie perpendicularly to the direction of propagation of the acoustic wave, send an echo which hits back to the transmitting ultrasonic transducer 1 which also functions as a receiver. The ultrasonic elements 2 of the ultrasonic transducer 1 receive the echo and transmit it to either common or separate receiving amplifier (not shown in figures) of each ultrasonic element 2 which then amplifies it sufficiently for the calculation. The sum result of the most intense signals defines the intensity of the light element 8, which light element 8 in the display 3 corresponds to the direction of the transmitted wave crest. On the basis of the obtained echo, the indicator, such as a LED, of the corresponding point on the display 3 is controlled. The brightness of the LED is proportional to the intensity of the echo. The electronic unit 4 is capable of calculating accurately the distance and direction of the obstacle that sent the echo on the basis of the time of arrival of the echo and is capable of showing the measured results in visual form on the display 3.

At the next stage, a wave crest is sent from the ultrasonic transducer 1 to the following direction which deviates from the previous direction by a specific angle. It is clear that the smaller the angle the better accuracy of the display image 7 that is resolution is obtained but, on the other hand, the greater number of measurements and more calculation is required for the production of the image. In this way, the whole viewed search area is scanned i.e. is swept and a "dotted image" of the whole viewed search area is obtained on the display 3. The ultrasonic transducer 1 continuously and quickly scans over the viewed search area so that the image is sufficiently kept up with the real time and the image changes realistically, as the smoke diver moves.

The display 3 can be, for example a rectangular matrix formed of LEDs. Besides light emitting LEDs, the single light elements 8 of the display 3 can also be light reflecting or light absorbing pointlike elements. Therefore, the display can be realized by means of a display which is based on electroluminescence or liquid crystals. The electronic unit 4 either lights the LED or, in some other way, provides the light point of the display of another kind with certain intensity to indicate the particular direction and distance of the viewed search area. It is beneficial to use such an arrangement where the brightness of the light elements 8 depends on the intensity of the corresponding echo signal. Then, the nearby objects reflecting strongly look bright in the display image 7 compared to objects which lie farther away. The time of after-illumination is chosen so that there is no flickering or excess flickering in the display image 7.

The display image 7 of the display 3 is viewed through a viewing device 6 which comprises, for example lenses, mirrors, prisms or other apparatuses which reflect the display image 7 onto the retina in such a way that it is observed with dimensions which correspond to reality. Therefore by means of the optics of the viewing device, the objects in the display image 7 are seen essentially as large as they are seen normally. This is of great importance in that the person using the search device "sees" the surroundings as naturally as possible. The viewing device also makes it possible that the display image 7 can be formed at a distance from the eyes that is shorter than the so-called limit of clear vision which is approximately 20 cm. Preferably this distance is 2–15 cm.

The search device can contain one or two displays 3 and one or two ultrasonic transducers 1. If there is one ultrasonic transducer 1 and two displays 3, the image can be formed so that it has a three dimensional impression by utilizing the calculating capacity and the memory capacity of the electronic unit 4. Formation of a three dimensional image from two display images 7, 7' is a technique which is well known and which is used in cinemas and in so-called View-master-apparatuses. It is to be noted that the second display image 7' which is needed in the formation of an image with a three dimensional impression can be achieved from the same measurement of the ultrasonic transducer 1. Such an embodiment of the invention is also possible where two separate ultrasonic transducers are used. In this case, directing and focusing of the ultrasonic wave crest is easier to realize. It is also possible to form a three dimensional image from one display image. This is realized so that the display image is successively directed to the first eye and then to the second eye and so on. If this operation is repeated with a suitable rhythm, a similar impression is obtained as if looking at two different images. Transferring of the image from one eye to another can be achieved by means of prisms, mirrors and electronic shutters placed in connection with the viewing device 6.

Since the perspective and dimensions of the three dimensional display image 7 correspond to the field of vision, the reality in front of the smoke diver, the search device placed in connection with the protective cap 9 of the smoke diver does not prevent by any means the smoke diver from moving and proceeding in the burning building but instead makes moving more confident. The viewing device 6, the display 3 and the ultrasonic transducer are preferably placed in succession in the direction of the sight. In this case, the ultrasonic transducer 1 generates a display image 7 which is as natural as possible since it is measured exactly at the eye level and since the display image 7 changes whenever the head is turned.

The resolution of the display image does not have to be very high, it is enough that objects, that otherwise would be mixed up with the objects that are searched, are distinguished therein. The operating distance of the search device can be adjusted so that the resolution will not decrease too much. In case the ultrasonic transducer 1 is very large and it contains a great number of ultrasonic elements 2, one obtains a high resolution but, at the same time, the ability of the device to operate in real time is decreased unless one uses several different frequencies or some other suitable method.

The ultrasonic search device according to the present invention can be provided with a feature which facilitates visual viewing, whereupon the device can, from the point of view of the ultrasound, be one or two channelled. In this case, a visual field of the search area is seen by one eye and the display image 7 is seen by the other eye. Therefore, the display image 7 can be seen only by one eye. Such an arrangement is also possible where both eyes are provided with facilities for visual viewing.

The surface of the ultrasonic transducer 1, from which the wave crest is transmitted, is preferably convex. The cone angle of the ultrasonic transducer is typically 30°-50°. The cone angle is defined as the angle, for example in the horizontal plane, at which the ultrasonic transducer is capable of seeing the viewed area. It is obvious that it is possible to increase the cone angle by increasing the curvature. Increasing of the cone angle naturally reduces the resolution. In a corresponding way, it is possible to increase resolution by decreasing the cone angle. Such an arrangement is also possible where the cone angle is adjustable and the resolution can be changed as required.

The invention is not limited to the embodiments described above but it can be varied within the limits of the enclosed claims. The search device can be provided with some systems which make the searching operation more effective. In case that only weak echoes are received from the surroundings, the search device can include a system which receives the weak signals for a longer periods of time, several times in succession, that is time of integration is increased. Furthermore, the search device used by the smoke diver can contain a audible alarm system, which informs of possible operational failures or particular environmental conditions. For instance, if there is a large oblique surface in front of the smoke diver and there is no echo coming to the device and the display image is dark. In this case, the audible alarm system gives a message that the device is in operation although there is nothing to be seen in the display image 7. In connection with the search device, an internal radio telephone can be used for transferring audible messages and other radio line for transferring images. It is also possible to utilize the device as an auxiliary device for automatic or controlled apparatuses like robots. When the search device is used in underwater operations, it can added with controls and operations functioning by means of ultrasound.

I claim:
1. An acoustic search device including:
   (a) a protective cap insertable over the head of a wearer;
   (b) a face part constituting an integral part of said protective cap; and
   (c) searching means located within said face part and including an optical viewing device, at least one first display and at least one ultrasonic transducer, all positioned in succession in the direction of sight at the eye level of the wearer, an electronic control unit, and a source of electric power for said electronic control unit;
   (d) said ultrasonic transducer including a plurality of elements controlled by said electronic control unit for transmitting acoustic signals toward a viewed search area and for receiving echo signals therefrom;
   (e) said display being controlled by said electronic control unit fir displaying an image of the viewed search area based on the echo signals reflected from the viewed search area; and
   (f) said optical viewing device being adapted to allow viewing of said display image by said wearer.

2. An acoustic search device comprising an ultrasonic transducer with a plurality of elements for transmitting acoustic signals toward a viewed search area and for receiving echo signals therefrom, a display, an electronic unit and an optical viewing device, said electronic unit for controlling said transducer and said display, said display showing a display image of the viewed search area based on the echo signals reflected from the viewed search area and said display image being seen by means of the optical viewing device, wherein the optical viewing device, the display, and the ultrasonic transducer are arranged to form a part of the protective cap of a diver and wherein the optical viewing device, the display, and the ultrasonic transducer are situated in said protective cap, substantially in succession in the direction of sight of the diver.

3. A search device according to claim 1, wherein said searching means includes a second display, said optical viewing device being adapted to effect, by means of the two display images of the first and second displays, a three dimensional impression by using known imaging techniques.

4. A search device according to claim 2, wherein said searching means includes a second display, said optical viewing device being adapted to effect, by means of the two display images of the first and second displays, a three dimensional impression by using known imaging techniques.

5. A search device according to claim 3, further comprising a second ultrasonic transducer, said display images being obtained by means of said two ultrasonic transducers.

6. A search device according to claim 1, wherein the surface of the ultrasonic transducer from which the wave crest is transmitted is curved.

7. A search device according to claim 1, wherein the surface of the ultrasonic transducer from which the wave crest is transmitted is convex.

8. A search device according to claim 1, wherein said display image is composed of single light elements and wherein the brightness of the light elements depends on the intensity of the corresponding echo signal, whereupon objects of the viewed search area lying closer to the ultrasonic transducer look brighter in the display image than objects of the viewed search area lying farther away from the ultrasonic transducer.

9. A search device according to claim 2, wherein an accumulator, arranged to be portable on one's back, serves as the power supply for the search device.

10. A search device according to claim 1, wherein said source of electric power is a portable accumulator.

11. A search device according to claim 1, further comprising an alarm system which provides an alarm when the search device is functioning and the echo signals received by the ultrasonic transducer are below a predetermined value.

* * * * *